(12) United States Patent
Bolisetty et al.

(10) Patent No.: US 11,953,973 B2
(45) Date of Patent: Apr. 9, 2024

(54) PRIORITIZATION OF SUCCESSFUL READ RECOVERY OPERATIONS FOR A MEMORY DEVICE

(71) Applicant: Micron Technology, Inc., Boise, ID (US)

(72) Inventors: Naveen Bolisetty, Hyderabad (IN); Tingjun Xie, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 17/809,731

(22) Filed: Jun. 29, 2022

(65) Prior Publication Data

US 2023/0393918 A1    Dec. 7, 2023

Related U.S. Application Data

(60) Provisional application No. 63/365,641, filed on Jun. 1, 2022.

(51) Int. Cl.
*G06F 11/00* (2006.01)
*G06F 11/07* (2006.01)

(52) U.S. Cl.
CPC .......... *G06F 11/076* (2013.01); *G06F 11/073* (2013.01)

(58) Field of Classification Search
CPC . G06F 11/076; G06F 11/0793; G06F 11/1048
See application file for complete search history.

(56) References Cited

U.S. PATENT DOCUMENTS

| 9,632,868 | B2* | 4/2017 | Song | G11C 29/028 |
| 2015/0019922 | A1* | 1/2015 | Leem | G11C 16/3418 |
| | | | | 714/706 |
| 2015/0089278 | A1* | 3/2015 | Patapoutian | G06F 11/1048 |
| | | | | 714/6.12 |
| 2018/0046527 | A1* | 2/2018 | Reusswig | G06F 11/004 |
| 2019/0108091 | A1* | 4/2019 | Chen | G06F 11/1068 |
| 2022/0148671 | A1* | 5/2022 | Ren | G11C 29/12005 |

* cited by examiner

*Primary Examiner* — Marc Duncan
(74) *Attorney, Agent, or Firm* — Harrity & Harrity, LLP

(57) ABSTRACT

In some implementations, a memory device may detect a first read failure associated with a page type and a memory section of the memory device. The memory device may perform multiple read recovery operations in a first order defined by a first sequence of read recovery operations. The memory device may identify a read recovery operation that results in successful recovery from the first read failure. The memory device may reorder the first sequence of read recovery operations to generate a second sequence of read recovery operations that prioritizes the read recovery operation. The memory device may detect a second read failure associated with the page type and the memory section. The memory device may perform one or more read recovery operations to recover from the second read failure in a second order defined by the second sequence of read recovery operations.

25 Claims, 12 Drawing Sheets

| Read Recovery Operation | Read Recovery Name | Description | Read Recovery Description | Energy Factor | |
|---|---|---|---|---|---|
| 1 | RR0 | Read Retry 0 + Hard LDPC | 0 mV (Retry with current settings) | 1 | Low Energy / Eligible for prioritization |
| 2 | RR2 | Read Retry 2 + Hard LDPC | -300 mV | 1 | |
| 3 | RR1 | Read Retry 1 + Hard LDPC | -600 mV | 1 | |
| 4 | RR4 | Read Retry 4 + Hard LDPC | +300 mV | 1 | |
| 5 | RR3 | Read Retry 3 + Hard LDPC | +600 mV | 1 | |
| 6 | RR6 | Read Retry 6 + Hard LDPC | -900 mV | 1 | |
| 7 | RR5 | Read Retry 5 + Hard LDPC | +900 mV | 1 | |
| 8 | RR16 | Read Retry 16 + Hard LDPC | -1200 mV | 1 | |
| 9 | RR7 | Read Retry 7 + Hard LDPC | +1200 mV | 1 | |
| 10 | RR8 | Read Retry 0 + CR + Hard LDPC | 0 mV + Corrective Read | 3 | High Energy / Ineligible for prioritization |
| 11 | RR14 | Read Retry 6 + CR + Hard LDPC | -900 mV + Corrective Read | 3 | |
| 12 | RR13 | Read Retry 5 + CR + Hard LDPC | +900 mV + Corrective Read | 3 | |
| 13 | RR6 + ARC | Read Retry 6 + ARC | -900 mV + ARC | 6 | |
| 14 | RR0 + ARC + Soft | Read Retry 0 + ARC + Soft LDPC | 0 mV + Soft LDPC | 5 | |
| 15 | RR5 + ARCp1 | Read Retry 5 + ARC | +900 mV + ARC | 6 | |
| 16 | RR0 + ARC + Soft | Read Retry 0 + ARC + Soft LDPC | 0 mV + Soft LDPC | 5 | |
| 17 | RR0 + RAID | Read Retry 0 + RAID | 0 mV + RAID | 66 | |

FIG. 6

| State | Sequence of Read Recovery Operations | Flag Status | Disable Flag Counter | Success Counter | Read Last RR exists | Successful Read Recovery Operation |
|---|---|---|---|---|---|---|
| 0 (init.) | {0, -300, -600, +300, +600...} | disabled | 0 | 0 | 0 | -600 |
| 1 | {0, -600, -300, +300, +600...} | disabled | 0 | 1 | 1 | -600 |
| 2 | {0, -600, -300, +300, +600...} | disabled | 0 | 2 | 1 | -900 |
| 3 | {0, -600, -300, +300, +600...} | disabled | 0 | 2 | 1 | ARC or LDPC soft decoding used |
| 4 | {0, -600, -300, +300, +600...} | disabled | 0 | 2 | 1 | -300 |
| 5 | {0, -300, -600, +300, +600...} | disabled | 0 | 1 | 1 | 0 |
| 6 | {0, -300, -600, +300, +600...} | disabled | 0 | 1 | 1 | +600 |
| 7 | {0, +600, -300, -600, +300...} | disabled | 0 | 2 | 1 | +600 |
| 8 | {0, +600, -300, -600, +300...} | disabled | 0 | 3 | 1 | +600 |
| 9 | {0, +600, -300, -600, +300...} | disabled | 0 | 0 | 0 | -300 |
| 10 | {+600, 0, -300, -600, +300...} | enabled | 1 | 1 | 1 | |
| 11 | {+600, 0, -300, -600, +300...} | enabled | | | | |
| 12 | ⋮ | ⋮ | ⋮ | ⋮ | ⋮ | ⋮ |

FIG. 8

| State | Sequence of Read Recovery Operations | Flag Status | Disable Flag Counter | Success Counter | Read Last RR exists | Successful Read Recovery Operation |
|---|---|---|---|---|---|---|
| 0 (init.) | {-600, 0, -300, +300, +600...} | enabled | 0 | 0 | 0 | -600 |
| 1 | {-600, 0, -300, +300, +600...} | enabled | 0 | 0 | 0 | +300 |
| 2 | {-600, 0, -300, +300, +600...} | enabled | 1 | 1 | 1 | -600 |
| 3 | {-600, +300, 0, -300, +600...} | enabled | 1 | 1 | 1 | ARC or LDPC soft decoding used |
| 4 | {-600, +300, 0, -300, +600...} | enabled | 1 | 1 | 1 | +600 |
| 5 | {-600, +600, 0, -300, +300...} | enabled | 2 | 1 | 1 | +600 |
| 6 | {-600, +600, 0, -300, +300...} | enabled | 3 | 2 | 1 | +300 |
| 7 | {0, +300, -300, -600, +600...} | disabled | 0 | 1 | 1 | -300 |
| 8 | {0, -300, -600, +300, +600...} | disabled | 0 | 1 | 1 | ... |
| 9 | ... | ... | ... | ... | ... | ... |

FIG. 9

PRIORITIZATION OF SUCCESSFUL READ RECOVERY OPERATIONS FOR A MEMORY DEVICE

CROSS-REFERENCE TO RELATED APPLICATION

This patent application claims priority to U.S. Provisional Patent Application No. 63/365,641, filed on Jun. 1, 2022, and entitled "PRIORITIZATION OF SUCCESSFUL READ RECOVERY OPERATIONS FOR A MEMORY DEVICE." The disclosure of the prior application is considered part of and is incorporated by reference into this patent application.

TECHNICAL FIELD

The present disclosure generally relates to memory devices, memory device operations, and, for example, to prioritization of successful read recovery operations for a memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 6 is a diagram illustrating an example of various read recovery operations that may be performed during a read recovery process.

FIG. 8 is a diagram illustrating an example of prioritizing read recovery operations associated with a read recovery process.

FIG. 9 is a diagram illustrating another example of prioritizing read recovery operations associated with a read recovery process.

DETAILED DESCRIPTION

Over time, a threshold voltage distribution associated with a certain data state of a memory cell may begin to broaden, which made lead to read page failures when a memory device is attempting to sense the voltage state of the memory cell and extract the binary data therefrom. In order to recover from a read page failure, a memory device may perform a series of read recovery operations in a sequential fashion. After each read page failure, the memory device may perform the same sequence of read recovery operations, which may be time consuming and consume a large number of computing and/or power resources associated with the memory device. Moreover, often a read recovery operation that was successful during a first iteration of a read recovery process may later work equally well during another iteration of the read recovery process with respect to the same memory section (e.g., the same logical unit number). However, because the memory device performs the series of read recovery operations in a sequential fashion, the memory device may first perform redundant (and ultimately unsuccessful) read recovery operations each iteration, unnecessarily increasing the computing and/or power resources consumed during the read recovery process.

Some implementations described herein enable read recovery processes that prioritize previously successful read recovery operations, thereby reducing or eliminating redundant read recovery steps. In some implementations, a memory device may prioritize a last successful read recovery operation, such that during subsequent read recovery processes the last successful read recovery operation is performed earlier in a sequence of read recovery operations. Moreover, in some implementations, after a certain read recovery operation has resulted in a successful recovery from read page failure a threshold number of times, the memory device may prioritize the read recovery operation such that it occupies an initial position in the sequence of read recovery operations, and thus is the first performed read recovery operation during subsequent read recovery processes. As a result, some implementations reduce an amount of time required to recover from read page failure while conserving computing, power, and other resources that would otherwise be required for traditional read recovery processes.

Figure 1:
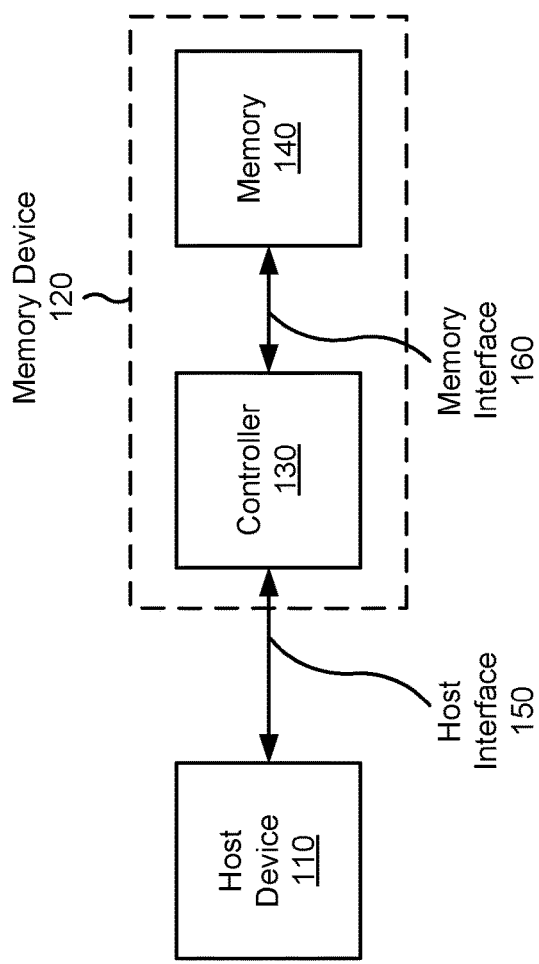
FIG. 1 is a diagram illustrating an example system capable of prioritization of successful read recovery operations.

FIG. 1 is a diagram illustrating an example system 100 capable of prioritization of successful read recovery operations. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
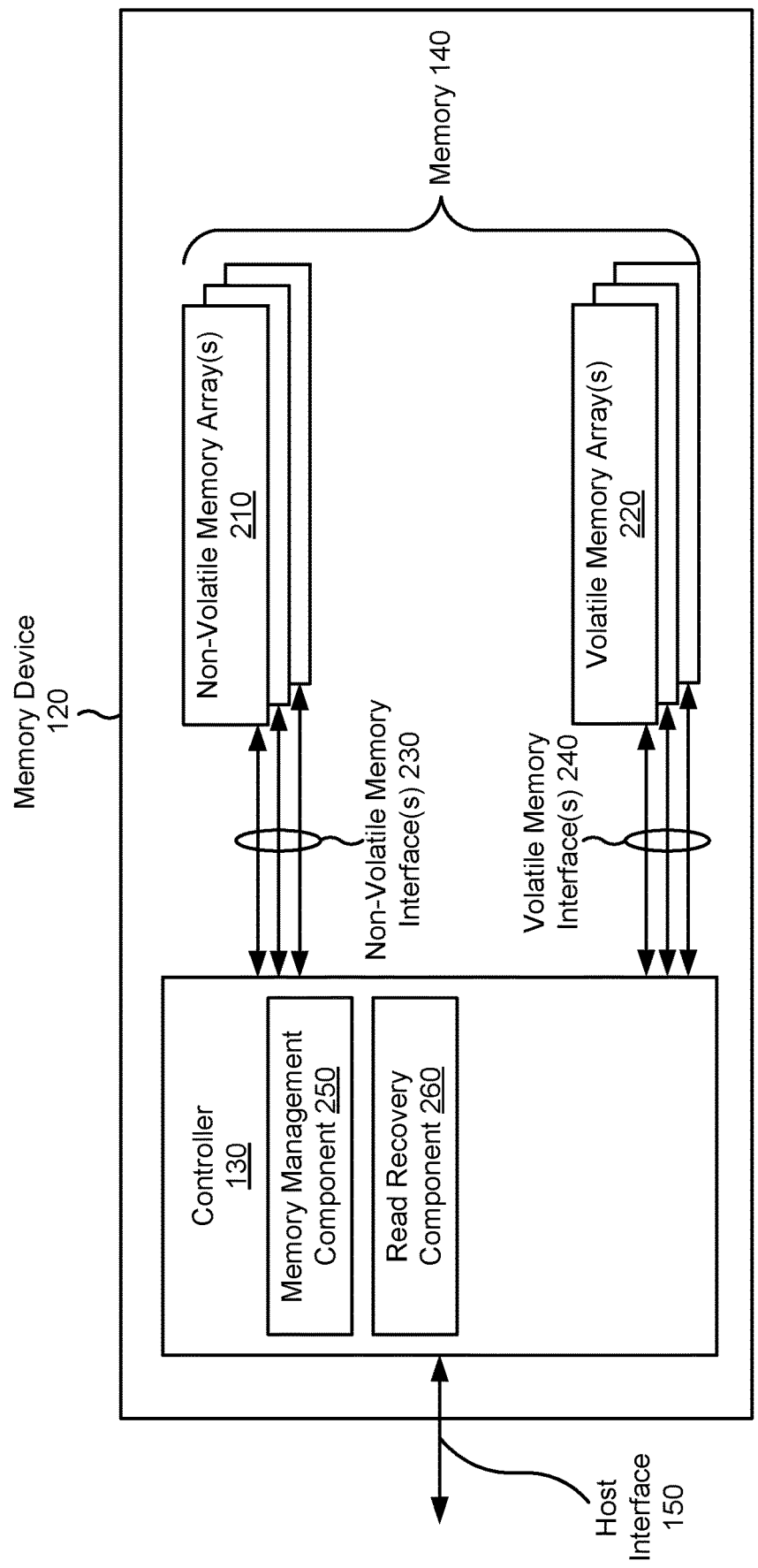
FIG. 2 is a diagram of example components included in the memory device of FIG. 1.

FIG. 2 is a diagram of example components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 120 via the host interface, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250 and a read recovery component 260. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The read recovery component 260 may be configured to perform read recovery processes to recover from read page failure and other read failures. For example, the read recovery component 260 may perform one or more read recovery operations such as adjusting a read reference voltage used to read a memory cell, and/or performing one or more additional error correction algorithms or processes such as redundant array of independent NAND (RAIN) recovery processes, redundant array of independent disks (RAID) recovery processes, second sync byte pattern (SB2) decoding processes, hard or soft low density parity check (LDPC) recovery processes, corrective read (CR) processes, automatic calibration recovery (ARC) processes, or the like.

Figure 10:
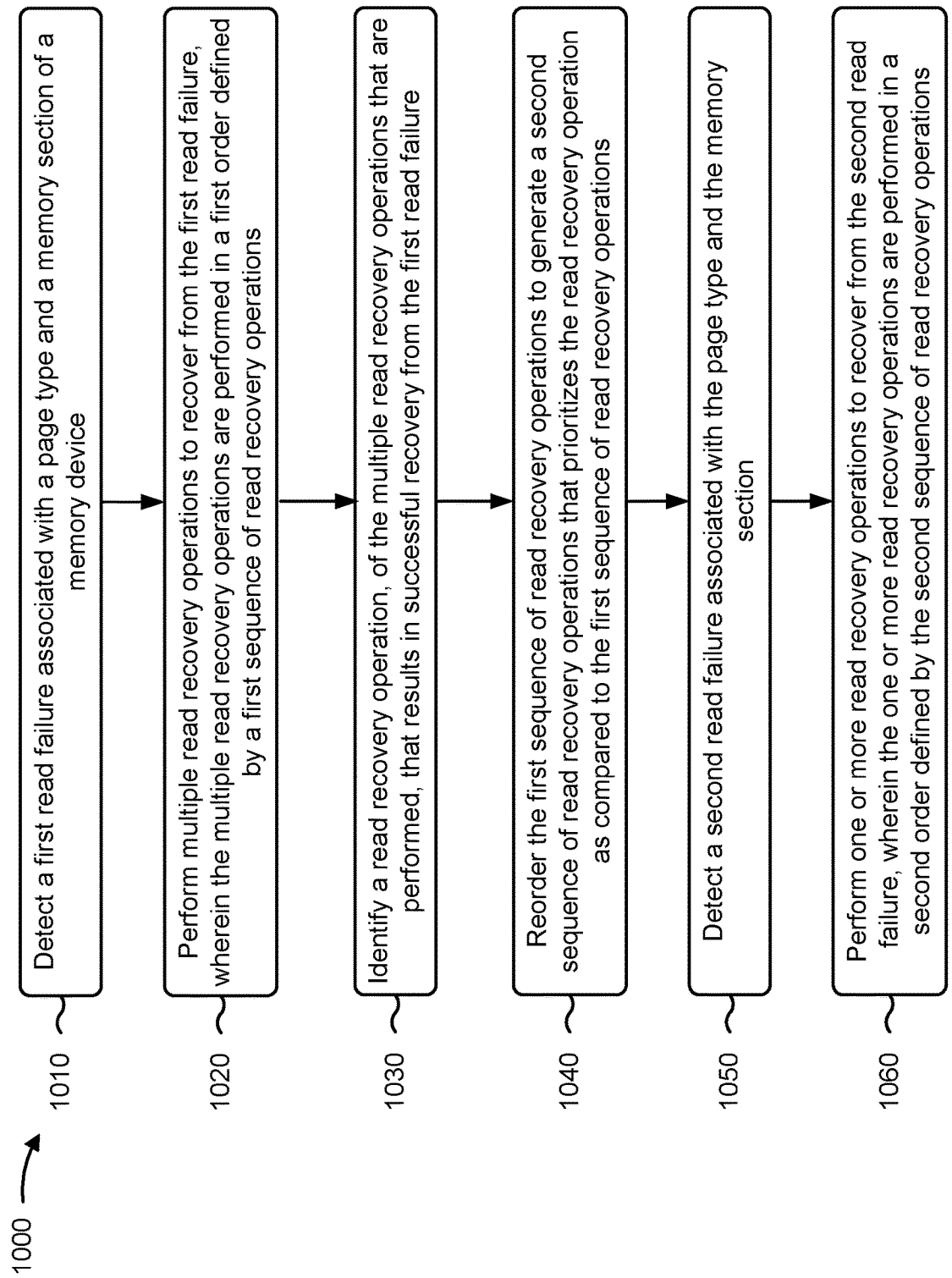
FIG. 10 is a flowchart of an example method associated with prioritization of successful read recovery operations.
Figure 11:
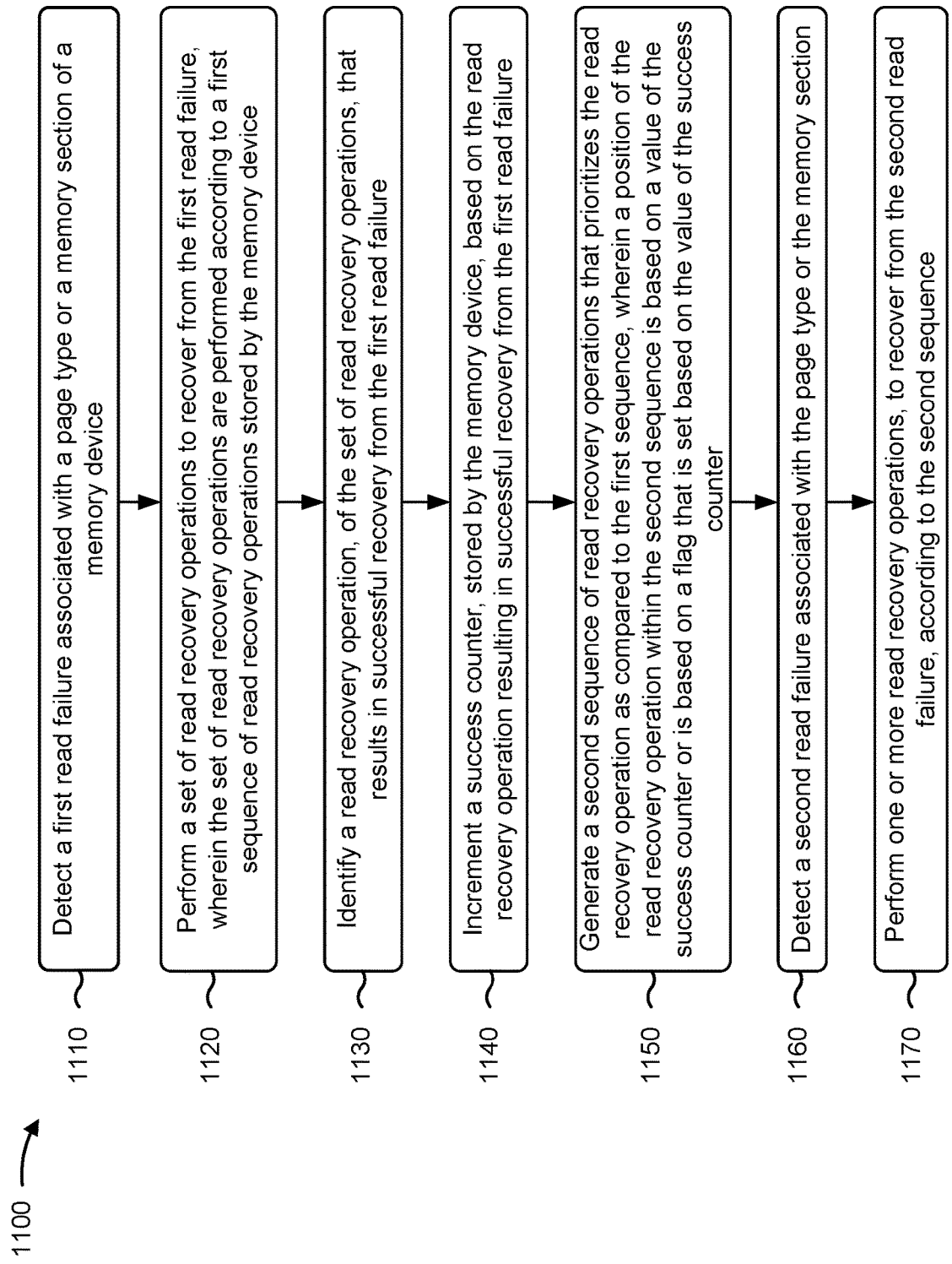
FIG. 11 is a flowchart of another example method associated with prioritization of successful read recovery operations.
Figure 12:
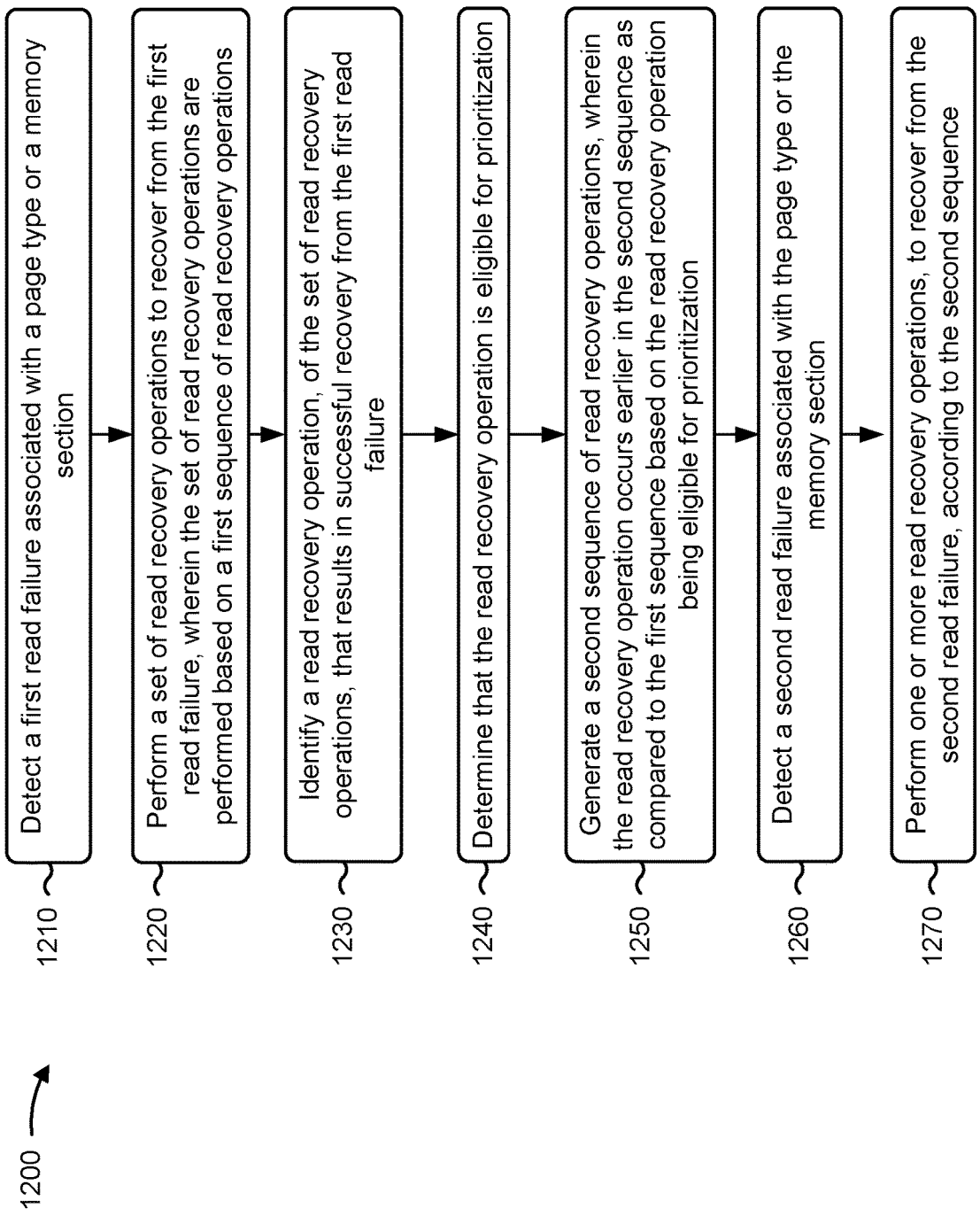
FIG. 12 is a flowchart of another example method associated with prioritization of successful read recovery operations.

One or more devices or components shown in FIG. 2 may be used to carry out operations described elsewhere herein, such as one or more operations of FIGS. 5-9 and/or one or more process blocks of the methods of FIGS. 10-12. For example, the controller 130 and/or the read recovery component 260 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
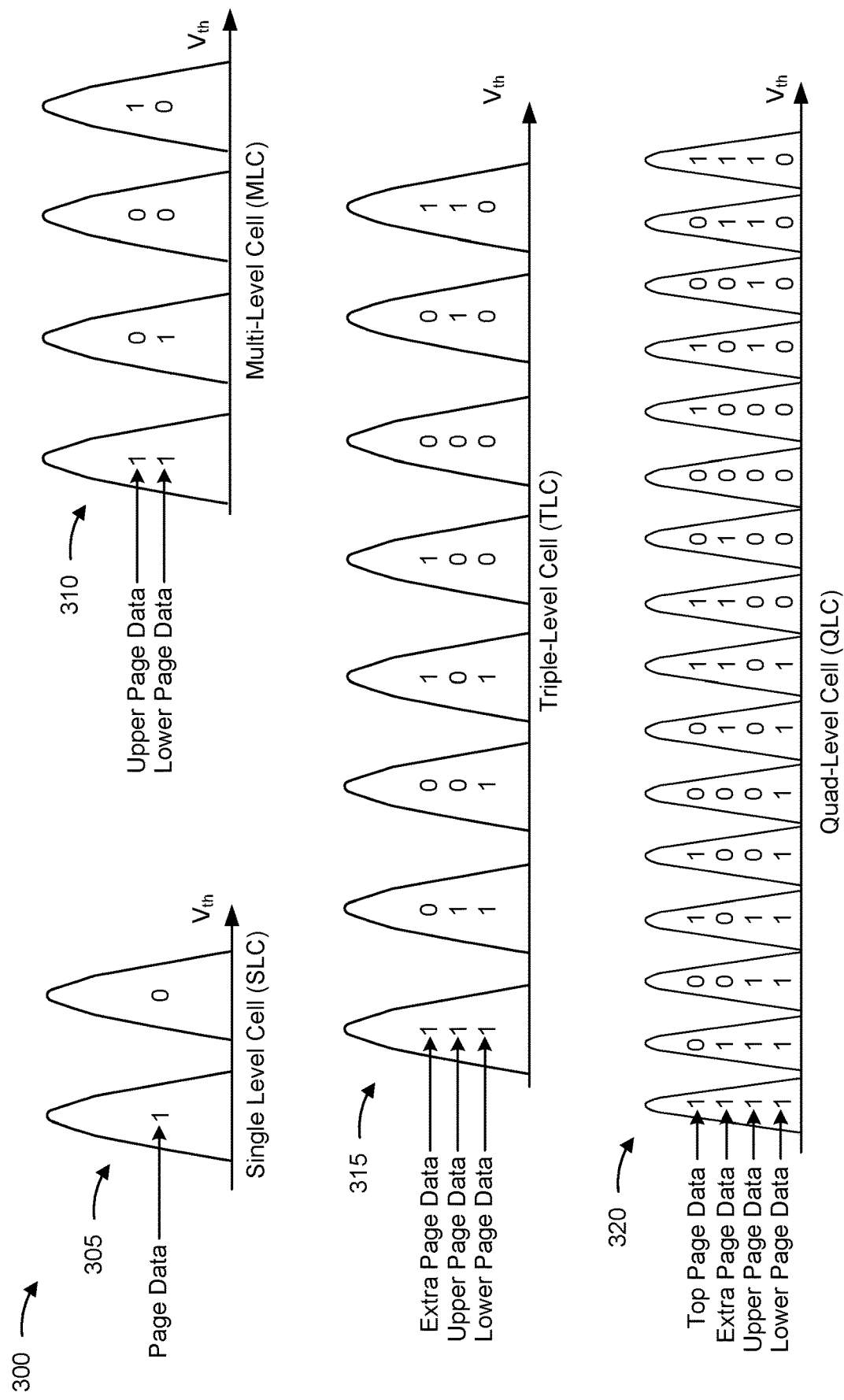
FIG. 3 is a diagram illustrating an example of single-level cell, multi-level cell, triple-level cell, and quad-level cell non-volatile memory devices.

FIG. 3 is a diagram illustrating an example 300 of single-level cell (SLC), multi-level cell (MLC), triple-level cell (TLC), and quad-level cell (QLC) non-volatile memory devices.

In some cases, non-volatile memory devices, such as NAND devices, may store bits of data by charging or not charging cells of the memory 140, which may include capacitors, transistors, floating gates, or the like capable of retaining a charge (e.g., electrons) even when no voltage is applied to the cell. For example, a non-volatile, solid-state memory device (e.g., a flash memory device) may include a floating gate transistor to store electrical charge, which may be isolated above and below by oxide insulating layers. The floating gate transistor may be selectively charged by applying a high voltage to a control gate proximate a first (or top) insulating layer, which causes electrons from a surrounding substrate proximate a second (or bottom) insulating layer to tunnel through the second insulating layer and to the floating gate, which is sometimes referred to as tunneling. Conversely, the floating gate transistor may be selectively erased by applying a high voltage to the substrate, which causes electrons from the floating gate transistor to tunnel through the second insulating layer and to the substrate. The presence of a charge in the floating gate transistor (and, in some cases, a level of the charge in the floating gate transistor) stores data in binary format.

More particularly, a non-volatile memory cell, such as a NAND cell, may be categorized as an SLC, an MLC, a TLC, or a QLC, among other examples. As shown by reference number 305, an SLC stores a single binary bit per memory cell, and thus may convey either binary 1 or binary 0. In an SLC, the stored bit is sometimes referred to as the page data of the memory cell. When writing to an SLC, the cell may be charged to a threshold voltage ($V_{th}$) falling within the distribution of the curve labeled with page data "1" when the memory cell is to store binary 1 (or else may include no charge when the memory cell is to store binary 1), and may be charged to a threshold voltage falling within the distribution of the curve labeled with page data "0" when the memory cell is to store binary 0.

Unlike an SLC, which only stores a single bit, an MLC, a TLC, and a QLC may store multiple bits per memory cell. More particularly, as shown by reference number 310, an MLC stores two binary bits per memory cell, and thus is capable of conveying binary 11, binary 01, binary 00, or binary 10 according to a level of a charged stored thereon. In an MLC, a first stored bit is sometimes referred to as the cell's upper page data, and the second stored bit is sometimes referred to as the cell's lower page data. When writing to an MLC, the cell may be charged to a threshold voltage falling within the distribution of the curve labeled with page data "11" when the memory cell is to store binary 11, the cell may be charged to a threshold voltage falling within the distribution of the curve labeled with page data "01" when the memory cell is to store binary 01, the cell may be charged to a threshold voltage falling within the distribution of the curve labeled with page data "00" when the memory cell is to store binary 00, and the cell may be charged to a threshold voltage falling within the distribution of the curve labeled with page data "10" when the memory cell is to store binary 10. Put another way, when an MLC's charge is close to 25% full, the cell represents binary 11, when the MLC's charge is close to 50% full, the cell represents binary 01, when the MLC's charge is close to 75%, the cell represents binary 00, and when the MLC's charge is close to 100% full, the cell represents binary 10.

In a similar manner, and as shown by reference number 315, a TLC stores three binary bits per memory cell, and thus a TLC is capable of storing binary 111, binary 011, binary 001, binary 101, binary 100, binary 000, binary 010, or binary 110. For a TLC, the first, second, and third stored bits are sometimes referred to as the cell's "extra page data," the cell's "upper page data," and the cell's "lower page data," respectively. Moreover, as shown by reference number 320, a QLC stores four binary bits per memory cell, and thus is capable of storing binary 1111, binary 0111, binary 0011, binary 1011, binary 1001, binary 0001, binary 0101, binary 1101, binary 1100, binary 0100, binary 0000, binary 1000, binary 1010, binary 0010, binary 0110, or binary 1110. For a QLC, the first, second, third, and fourth bits are sometimes referred to as the cell's "top page data," the cell's "extra page data," the cell's "upper page data," and the cell's "lower page data," respectively. More broadly, for an n-bit memory cell, the threshold voltage of the cell may be programmed to $2^n$ separate states, with each state corresponding to a non-overlapping threshold distribution, as shown for the various memory cells in FIG. 3.

To read the data stored in a memory cell such as an SLC, an MLC, a TLC, a QLC, or other type of memory cell, a controller 130 of the memory device 120 may sense a voltage associated with the stored charge on the memory cell (e.g., the controller 130 may sense a $V_{th}$ associated with the cell), and determine a corresponding binary number associated with that voltage. Aspects of reading a memory cell are described in more detail in connection with FIG. 4.

As indicated above, FIG. 3 is provided as an example. Other examples may differ from what is described with regard to FIG. 3.

Figure 4:
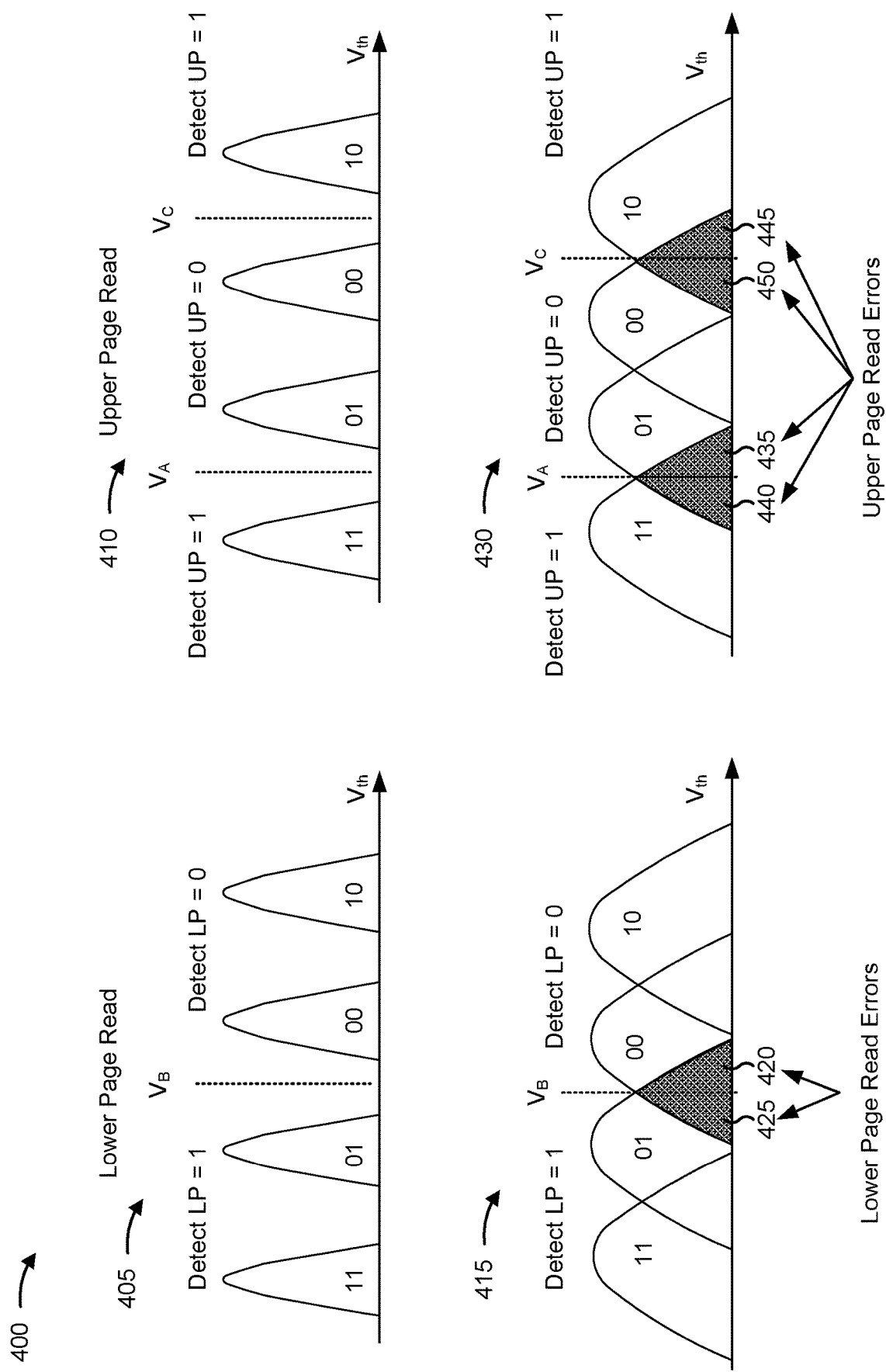
FIG. 4 is a diagram illustrating an example of read errors that may occur in a multi-level cell non-volatile memory device.

FIG. 4 is a diagram illustrating an example 400 of read errors that may occur in an MLC non-volatile memory device. Although the read errors of FIG. 4 are described in the context of an MLC for convenience, the concepts apply to other types of memory cells, such as SLCs, TLCs, QLCs, and other memory cells.

As described above in connection with FIG. 3, certain memory devices 120 may be capable of storing multiple bits per memory cell. For example, an MLC non-volatile memory device (e.g., an MLC flash device) may be capable of storing two bits of information per memory cell in one of four states (e.g., may store binary 11, binary 01, binary 00, or binary 10 depending on a charge applied to the memory cell), as described. To read the data of a memory cell, such as the MLC shown in FIG. 4, the controller 130 or similar component of the memory device 120 may apply a read reference voltage to the cell in an effort to induce current in the memory cell, and may determine a corresponding bit string associated with a voltage that induced (or else did not induce) current. Put another way, the controller may apply various read reference voltages to sense the threshold voltage ($V_{th}$) associated with the data stored in the cell.

More particularly, for an MLC, the controller 130 may perform a lower page read and an upper page read. As shown by reference number 405, for a lower page read, the controller may apply to a read reference voltage indicated as $V_B$. $V_B$ may represent a voltage between threshold voltage distributions associated with the first two states (e.g., threshold voltage distributions associated with binary 11 and 01) and threshold voltage distributions associated with the second two states (e.g., threshold voltage distributions associated with binary 00 and 10). If current flows when $V_B$ is applied to the memory cell, the threshold voltage may be considered to be less than $V_B$, thus corresponding to one of binary 11 or binary 01 (meaning that the lower page data is bit 1). If current does not flow when $V_B$ is applied to the memory cell, the threshold voltage may be considered to be more than $V_B$, thus corresponding to one of binary 00 or binary 10 (meaning that the lower page data is bit 0).

An upper page read may be performed in a similar manner, as shown by reference number 410. More particularly, when the detected lower page data is bit 1, a read reference voltage of $V_A$ may be applied to the memory cell to thereafter determine the upper page data. $V_A$ may represent a voltage between a threshold voltage distribution associated with the first state (e.g., a threshold voltage distribution associated with binary 11) and a threshold voltage distribution associated with the second state (e.g., a threshold voltage distribution associated with binary 01). If current flows when $V_A$ is applied to the memory cell, the threshold voltage may be considered to be less than $V_A$, thus corresponding to binary 11 (meaning that the upper page data is bit 1). If current does not flow when $V_A$ is applied to the memory cell, the threshold voltage may be considered to be more than $V_A$ but less than $V_B$ (as determined during the lower page read), thus corresponding to binary 01 (meaning that the upper page data is bit 0). Similarly, when the detected lower page data was bit 0, a read reference voltage of $V_C$ may be applied to the memory cell to thereafter determine the upper page data. $V_C$ may represent a voltage between a threshold voltage distribution associated with the third state (e.g., a threshold voltage distribution associated with binary 00) and a threshold voltage distribution associated with the fourth state (e.g., a threshold voltage distribution associated with binary 10). If current flows when $V_C$ is applied to the memory cell, the threshold voltage may be considered to be less than $V_C$ but more than $V_B$ (as determined during the lower page read), thus corresponding to binary 00 (meaning that the upper page data is bit 0). If current does not flow when $V_C$ is applied to the memory cell, the threshold voltage may be considered to be more than $V_C$, thus corresponding to binary 10 (meaning that the upper page data is bit 1).

In some cases, the threshold voltage distributions shown in FIGS. 3 and 4 may be broadened due to noise or the like, which may lead to read errors at the memory device. Noise in the memory cell may be caused by various sources, such as program-erase (P/E) cycling stress, charge leakage over time, read disturbances (e.g., disturbances caused by the application of a high voltage to a memory cell of a page not being read to deselect the cell while other cells on the page are being read), programming errors, cell-to-cell interference (such as unintentional electrical disturbance and/or interference of a memory cell when neighboring cells are read, written, or erased), or the like. As shown in FIG. 4, broadened voltage threshold distributions may lead to read errors, such as lower page read errors and/or upper page read errors.

First, as shown by reference number 415, a lower page read error may be caused by voltage distributions that are near $V_B$ broadening and, in some cases, overlapping with $V_B$. In the example shown, due to noise or the like, the threshold voltage distributions associated with binary 01 and binary 00 have broadened to overlap with the read reference voltage $V_B$. This may result in a lower page read error, because a cell programmed with binary 01 may act in a similar manner to a cell programmed with binary 00. More particularly, if $V_B$ is applied to a memory cell that stores binary 01 but that is associated with a threshold voltage in the area labeled with reference number 420, no current would flow, erroneously indicating that the lower page data is bit 0, not bit 1. On the other hand, if $V_B$ is applied to a memory cell that stores binary but that is associated with a threshold voltage in the area labeled with reference number 425, current would flow, erroneously indicating that the lower page data is bit 1, not bit 0.

Similarly, when performing an upper page read, as shown by reference number 430, an upper page read error may be caused by voltage distributions that are near $V_A$ and/or $V_C$ broadening and overlapping with $V_A$ and/or $V_C$. For example, memory cells storing binary 11 and associated with a threshold voltage in the area labeled by 435 may be erroneously read as storing upper page data of bit 0, memory cells storing binary 01 and associated with a threshold voltage in the area labeled by 440 may be erroneously read as storming upper page data of bit 1, memory cells storing binary 00 and associated with a threshold voltage in the area labeled by 445 may be erroneously read as storing upper page data of bit 1, and memory cells storing binary 10 and associated with a threshold voltage in the area labeled by 450 may be erroneously read as storing upper page data of bit 0.

In some cases, a memory device 120 may attempt to adjust one or more read reference voltages in response to one or more of the read errors described above (e.g., in response to a cell storing one logical value or binary number being misread as storing a different logical value or binary number). In some instances, this may be referred to as a read retry or a read recovery process. In a read recovery process, one or more read reference voltages (such as $V_A$, $V_B$, or $V_C$ described in connection with the MLC) may be dynamically adjusted to track changes in threshold voltage distributions. More particularly, once a read process fails on a particular page of a memory 140, the memory device 120 (and, more particularly, the controller 130 and/or the read recovery component 260 thereof) may attempt to recover the page using various read recovery steps, which use shifts in voltages from base read reference voltages. Put another way, the memory device 120 may retry the read of a cell with an adjusted read reference voltage such that read errors are decreased or eliminated.

Returning to the example shown in FIG. 4, if a lower page error resulted in a cell storing binary 00 being read as binary 01, the read reference voltage ($V_B$) may be decreased (e.g., shifted to the left in the diagram shown by reference number 415) in an effort to eliminate the lower page read error. Conversely, if a lower page error resulted in a cell storing binary 01 being read as binary 00, the read reference voltage ($V_B$) may be increased (e.g., shifted to the right in the diagram shown by reference number 415). Similarly, the read reference voltages $V_A$ and $V_C$ may be shifted left or right (e.g., decreased or increased) in an effort to reduce or eliminate upper page read errors.

In some instances, a memory device 120 may implement a read recovery process by attempting various read recovery operations or steps in a given sequence to recover the data. For example, a memory device 120 implementing a read recovery process may apply a first step, sometimes referred to as a first error recovery step, in an effort to recover the data, and, if unsuccessful, may apply a second step, a third step, and so forth until the data is successfully recovered. In some aspects, the various read recovery steps may include increasing or decreasing a read reference voltage by a specific amount in an effort to recover the data (e.g., shifting one of $V_A$, $V_B$, or $V_C$ left or right in an effort to recover the data, as described). Additionally, or alternatively, one or more of the read recovery steps may be associated with various error correction algorithms or processes such as RAIN recovery processes, RAID recovery processes, SB2 decoding processes, hard or soft LDPC recovery processes, CR processes, ARC processes, or the like.

Because the read recovery steps may be performed in a sequential fashion, the read recovery process may take a considerable amount of time and/or may consume a considerable amount of power, computing, and other resources. Moreover, many of the read recovery steps may be redundant. This is because if one read recovery step (sometimes referred to as step read recovery step x) is successful in recovering data for a particular memory 140 section (e.g., a particular logical unit number (LUN)), the same read recovery step (e.g., read recovery step x) may likely be successful for subsequent read recovery on the same memory section. Nonetheless, when performing subsequent read recovery processes, the memory device 120 may still apply the read recovery steps in the sequential fashion (e.g., may perform multiple steps before applying read recovery step x), resulting in redundant read recovery steps and inefficient usage of resources.

Some aspects of the disclosure enable elimination of redundant or unnecessary read recovery steps by keeping track of one or more successful read recovery steps (e.g., read recovery step x) and applying the one or more successful read recovery steps earlier in subsequent read recovery processes on the same memory section or LUN, thus reducing the time needed to perform a read recovery process, freeing power or computing resources that would have otherwise been used to perform an read recovery process, and otherwise improving a quality of service associated with the memory device 120. Aspects of implementing a read recovery process by eliminating redundant or unnecessary read recovery steps are described in more detail in connection with FIG. 5.

As indicated above, FIG. 4 is provided as an example. Other examples may differ from what is described with regard to FIG. 4.

Figure 5:
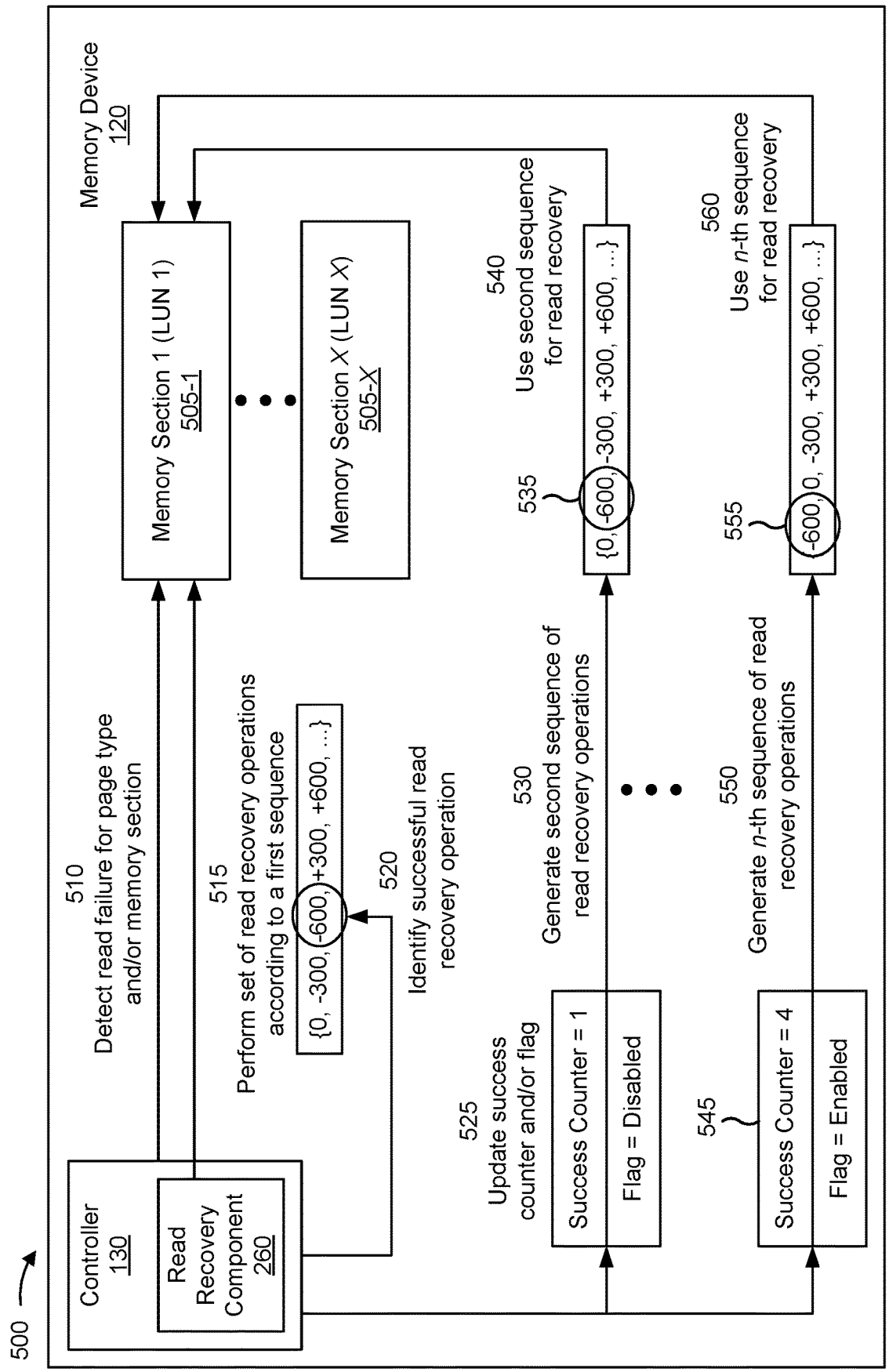
FIG. 5 is a diagram illustrating an example of a read recovery process performed by a memory device.

FIG. 5 is a diagram illustrating an example 500 of a read recovery process performed by a memory device 120.

As shown in FIG. 5, a memory device 120 (and, more particularly, a memory 140 of the memory device 120) may include multiple memory sections 505, sometimes referred to as LUNs. For example, the memory device may include a first memory section 505-1 (e.g., LUN 1) up to an X-th memory section 505-X (e.g., LUN X). In some implementations, as shown by reference number 510, the memory device 120 (and, more particularly, the controller 130 and/or the read recovery component 260 thereof) may detect a first read failure associated with a page type and/or a memory section of the memory device 120 (e.g., the first memory section 505-1). For example, the memory device 120 may be one of the memory devices described in connection with FIG. 3, and the page type may correspond to a particular bit of the particular type of memory cell (e.g., an SLC device, an MLC device, a TLC device, a QLC device, or a similar device) that stores a particular quantity of bits. In that regard, the page type may be a page of a SLC, a lower page of an MLC, an upper page of the MLC, a lower page of a TLC, an upper page of the TLC, an extra page of the TLC, a lower page of a QLC, an upper page of the QLC, an extra page of the QLC, or a top page of the QLC.

In some implementations, as shown by reference number 515, the memory device 120 may perform multiple read recovery operations (e.g., may perform a set of read recovery operations) to recover from the first read failure. For example, the memory device may implement one or more read recovery steps, which may shift a read reference voltage in an effort to eliminate the first read failure, as described in connection with FIG. 4. In some implementations, each read recovery operation may include shifting a read reference voltage (e.g., $V_A$, $V_B$, or $V_C$) by a specific voltage offset. Moreover, in some implementations, the multiple read recovery operations may be performed in a first order defined by a first sequence of read recovery operations. For example, performing the multiple read recovery operations may include shifting a read reference voltage according to an order defined by the sequence of voltages shown by reference number 515 (e.g., {0, −300, −600, +300, +600, . . . }, which are provided in millivolts (mV)). Thus, in some implementations, a first read recovery operation (e.g., a first read recovery step) may include shifting the read reference voltage 0 mV (e.g., the first step may include simply retrying the read with the current settings), a second read recovery operation may include shifting the read reference voltage −300 mV, a third read recovery operation may include shifting the read reference voltage −600 mV, a fourth read recovery operation may include shifting the read reference voltage +300 mV, a fifth read recovery operation may include shifting the read reference voltage +600 mV, and so forth. In some other implementations, the read recovery operations may include additional or different error correction processes, described in more detail in connection with FIG. 6, below.

As shown by reference number 520, the memory device 120 may identify a read recovery operation, of the multiple read recovery operations that are performed, that results in successful recovery from the first read failure. For example, the memory device 120 may first apply the first read recovery operation (e.g., shifting a read reference voltage by 0 mV), which may not result in a successful recovery from the first read failure. Thus, the memory device 120 may proceed according to the sequence of read recovery operations shown by reference number 515 until a read recovery operation results in a successful recovery from the first read failure. In the example shown in FIG. 5, this may be the third read recovery operation (e.g., shifting the read reference voltage by −600 mV), and thus the memory device 120 may identify the third read recovery operation as the one resulting in successful recovery from the first read failure.

As shown by reference number 525, the memory device 120 may update a success counter and/or a flag stored by the memory device 120 and associated with the read recovery operation that resulted in the successful recovery from the first read failure. More particularly, each time a read recovery operation results in a successful recovery, the memory device 120 may increment the success counter by one. In the example shown by reference number 525, because the third read recovery operation (e.g., the read recovery operation associated with a read reference voltage shift of −600 mV) in the depicted example resulted in successful recovery, the success counter is incremented from zero to one. In this instance, the flag may remain disabled, because the flag may only be enabled when a threshold level of successful recoveries have been performed (e.g., three successful recoveries).

As shown by reference number 530, the memory device 120 may generate a second sequence of read recovery operations. In some implementations, the second sequence of read recovery operations may be different than the first sequence of read recovery operations and/or may be based on a read recovery operation that resulted in successful recovery from the first read failure. More particularly, the memory device 120 may reorder the first sequence of read recovery operations to generate the second sequence of read recovery operations that prioritizes the successful read recovery operation (e.g., the third read recovery operation in the depicted example) as compared to the first sequence of read recovery operations. In this way, the third read recovery operation (e.g., the read recovery operation associated with a read reference voltage shift of −600 mV) may be advanced in the sequence, such as to the ordinal second position of the second sequence (sometimes referred to as the last successful read recovery position), as shown by reference number 535. In some implementations, a position of the read recovery operation within the second sequence is based on a value of the success counter (in this example, "1") or is based on a flag that is set based on the value of the success counter (in this example, "disabled"). Put another way, the successful read recovery operation may be set to an ordinal second position in the second sequence based on the value of the success counter failing to satisfy a threshold (e.g., a success threshold), and/or the flag being set to a disabled state. In such examples, the memory device 120 may maintain a default initial read recovery operation (0 mV in the depicted example) in an initial position (e.g., ordinal first position) of an active sequence of read recovery operations until the value of the success counter satisfies a threshold or until the flag is set to an enabled state. Aspects of the flag are described in more detail in connection with reference number 545, below.

As shown by reference number 540, the memory device 120 may then use the second sequence for purposes of read recovery. More particularly, in some implementations, the memory device 120 may detect a second read failure associated with the page type and/or the memory section (e.g., the first memory section 505-1, or LUN 1). Based on detecting the second read failure, the memory device 120 may perform one or more read recovery operations to recover from the second read failure, including performing the one or more read recovery operations in a second order defined by the second sequence of read recovery operations. That is, the memory device 120 may perform a first read recovery operation by shifting the read reference voltage 0 mV, and, if unsuccessful, may move to a second read recovery operation, which now includes shifting the read reference voltage −600 mV (rather than −300 mV, as was the case in connection with the first sequence of read recovery operations). If the second read recovery operation is not successful, the memory device 120 may continue to perform read recovery operations as indicated by the second sequence of read recovery operations (e.g., shifting the read reference voltage −300 mV, then +300 mV, then +600 mV, and so forth) until a read recovery operation results in a successful recovery from the second read failure.

Each time a certain read recovery operation results in a successful recovery from a read failure, a corresponding success counter may be incremented, as described in connection with reference number 525. For example, and as shown by reference number 545, if the third read recovery operation (e.g., shifting the read reference voltage −600 mV) has been successful three times, the success counter may be incremented to three. Moreover, the memory device 120 may set the flag to an enabled state based on the value of the success counter satisfying a threshold (e.g., a success threshold, which, in the depicted example, is four). That is, the memory device 120 may set the flag to an enabled state based on determining that a quantity of times that the read recovery operation has resulted in successful read failure recovery for the page type and the memory section (sometimes referred to as a success quantity) satisfies the success threshold. Additionally, the memory device 120 may reset the success counter based on setting the flag to the enabled state (e.g., may reset the success counter to 0).

Enabling the flag may result in a read recovery operation associated with the flag being moved to an initial position (e.g., an ordinal first position) in a sequence of read recovery operations. The initial position of the sequence of read recovery operations, or the ordinal first position, may sometimes be referred to as a sticky read position. For example, as described in connection with reference number 535, the read recovery operation associated with −600 mV was moved to the ordinal second position, but not the initial position, in the second sequence based on the previous success of the read recovery operation. In this way, reordering the first sequence may include moving the successful read recovery operation to a position in the second sequence other than an initial position (e.g., a position immediately following the initial position) based on determining that the success quantity does not satisfy a success threshold (e.g., four, in the depicted example).

However, once the success quantity does satisfy the success threshold (e.g., once the flag is enabled), the read recovery operation may be reordered to the initial position (e.g., the ordinal first position). More particularly, as shown by reference number 550, the memory device may generate an n-th sequence of read recovery operations, which may include reordering an (n−1)-th sequence of read recovery operations to generate the n-th sequence of read recovery operations that prioritizes the successful read recovery operation as compared to the (n−1)-th sequence of read recovery operations. In this instance, and as shown by reference number 555, the successful read recovery operation (e.g., the operation associated with −600 mV) has been moved to the initial position in the n-th sequence. Put another way, the memory device 120 may reorder a sequence by moving the successful read recovery operation to an initial position (e.g., a sticky read position) in a subsequent sequence based on determining that a success quantity satisfies a success threshold (e.g., four, in the depicted example) and/or based on determining that the flag is set to an enabled state.

Moreover, in some implementations, the memory device 120 may maintain the successful read recovery operation in the initial position while the flag is set to the enabled state. That is, the memory device 120 may maintain the read recovery operation in the ordinal first position in an active sequence of read recovery operations (e.g., a sequence being used to perform read recovery operations, such as the n-th sequence shown in FIG. 5) until the read recovery operation fails to result in successful read failure recovery for the page type or the memory section a threshold quantity of times (e.g., a failure threshold). Aspects of the flag being set to the enabled state and disabled state are described in more detail below in connection with FIGS. 8 and 9.

As indicated above, FIG. 5 is provided as an example. Other examples may differ from what is described with regard to FIG. 5.

FIG. 6 is a diagram illustrating an example 600 of various read recovery operations that may be performed during a read recovery process.

The table shown in FIG. 6 includes a series of read recovery operations (also referred to as error recovery steps) that may be performed by a memory device 120 in response to detecting a read failure, such as one of the read failures described above in connection with FIGS. 4 and 5. The error recovery steps shown in FIG. 6 may represent an initial order of a sequence of read recovery operations. That is, the order of error recovery steps shown in FIG. 6 may be a sequence of read recovery operations performed prior to the memory device 120 prioritizing any read recovery operation according to a previous success of a certain read recovery operation, or the like.

As shown in the second column of the table of FIG. 6, each read recovery operation may be associated with a read recovery name. For example, the first read recovery operation (which is associated with shifting a read reference voltage 0 mV, which is described in more detail below), may be referred to as "RR0." Moreover, in some implementations, an initial sequence of the read recovery operations may not be sequential with respect to the associated read recovery names. More particularly, as shown in FIG. 6, the initial sequence of 17 steps may include RR2 (rather than RR1) as the ordinal second read recovery operation, followed by RR1, RR4, RR3, and so forth as shown in the figure. In addition to, or instead of, being associated with a shift in a read reference voltage, some read recovery operations may be associated with other error recovery processes or operations. More particularly, the sequence of read recovery operations may include one or more of a plurality of read recovery operations corresponding to a plurality of read voltages, a CR operation, an ARC operation that identifies a read voltage, a soft LDPC recovery operation, a hard LDPC operation, or a redundant array recovery operation (e.g., a RAIN or RAID operation), among other examples.

In some implementations, each read recovery operation may be associated with an energy factor. The energy factor may be proportional to an amount of energy consumed by the memory device 120 when performing the corresponding read recovery operation. For example, in the depicted example, read recovery operations 1-9 are associated with an energy factor of 1, read recovery operations 10-12 are associated with an energy factor of 3, read recovery operations 14 and 16 are associated with an energy factor of 5, read recovery operations 13 and 15 are associated with an energy factor of 6, and read recovery operation 17 is associated with an energy factor of 66. In some implementations, read recovery operations associated with an energy factor of 1 (e.g., read recovery operations 1-9 in the depicted example) may be considered low energy operations, and read recovery operations associated with an energy factor of greater than 1 (e.g., read recovery operations 10-17 in the depicted example) may be considered high energy operations.

The low energy operations may be operations associated with shifting a read reference voltage by a certain amount and/or with a hard LDPC operation. The high energy operations, on the other hand, may be operations associated with additional error correction processes, such as ARC operations, soft LDPC operations, RAIN operations, RAID operations, or CR operations, among others. In some implementations, low energy operations may be eligible for prioritization (e.g., eligible to be advanced in the sequence of read recovery operations, as described in connection with FIG. 5), but high energy operations may not be eligible for prioritization. Put another way, the memory device 120 may be capable of reordering the low energy operations in order to prioritize a previously successful read recovery operation, but may not be capable of prioritizing high energy operations. Alternatively, high energy operations may be eligible for prioritization, but only when a condition is satisfied, such as after a certain age of the memory device 120. In some implementations, an age of the memory device 120 may be associated with a threshold number of P/E cycles that have been performed on the memory device 120 and/or a memory section of the memory device 120, such as 5,000 P/E cycles. Beneficially, in examples in which the high energy operations are not available for prioritization, the memory device 120 will first perform all available low energy operations prior to expending a greater number of resources associated with the high energy processes. Aspects of determining whether a read recovery operation is available for prioritization are described in more detail in connection with FIG. 7, below.

As indicated above, FIG. 6 is provided as an example. Other examples may differ from what is described with regard to FIG. 6.

Figure 7:
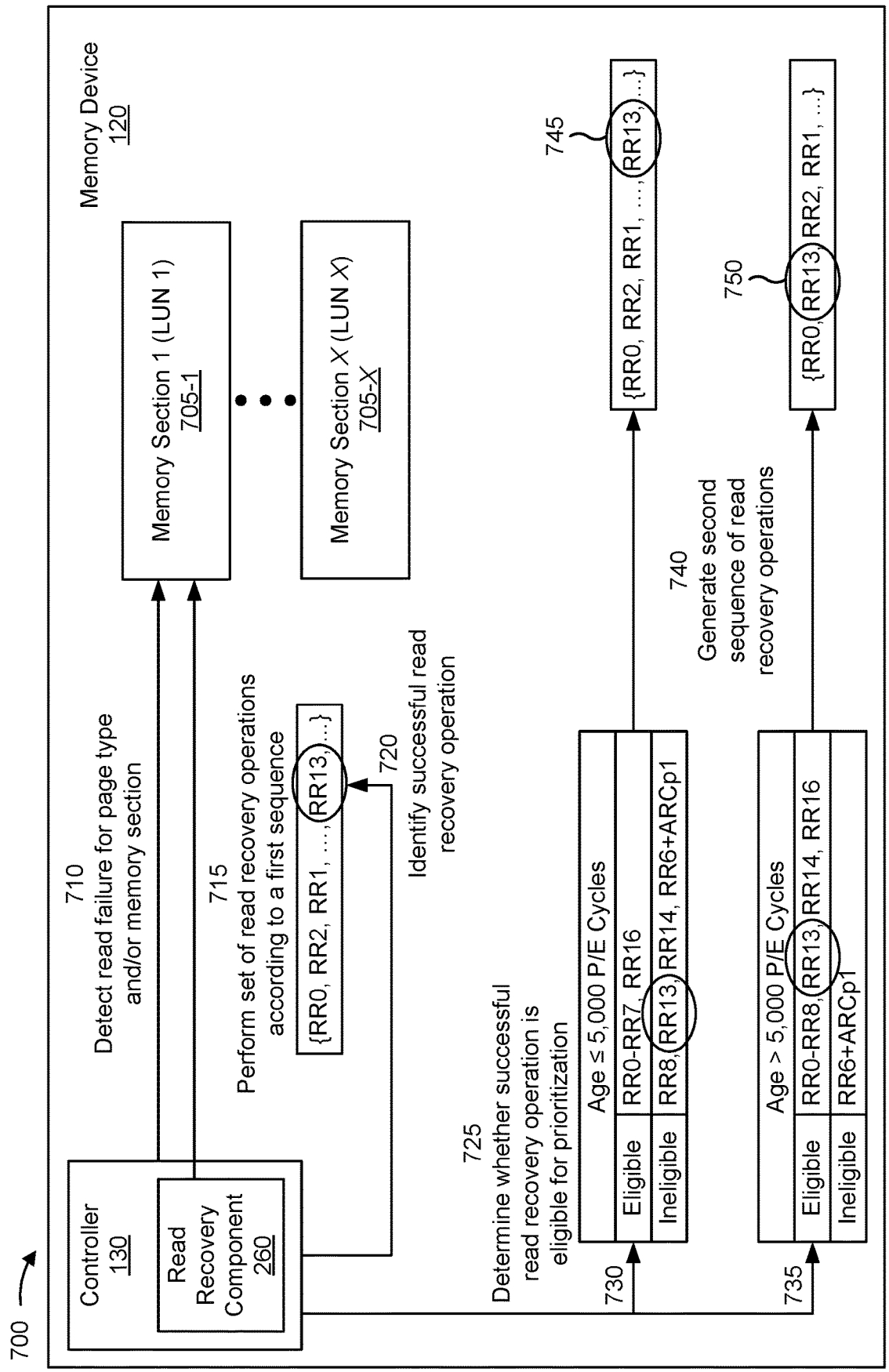
FIG. 7 is a diagram illustrating another example of a read recovery process performed by a memory device.

FIG. 7 is a diagram illustrating another example 700 of a read recovery process performed by a memory device 120.

As shown in FIG. 7, the memory device 120 may include a first memory section 705-1 (e.g., LUN 1) up to an X-th memory section 705-X (e.g., LUN X), which may be similar to the memory sections 505 described in connection with FIG. 5. Moreover, as shown by reference number 710, the memory device 120 may detect a first read failure associated with a page type and/or a memory section of the memory device 120 (e.g., the first memory section 705-1), in a similar manner as described in connection with reference number 510. In that regard, as shown by reference number 715, the memory device 120 may perform a set of read recovery operations to recover from the first read failure, in a similar manner as described in connection with reference number 515. For example, the memory device 120 may implement one or more read recovery steps described in connection with FIG. 6. In some implementations, the set of read recovery operations are performed based on a first sequence of read recovery operations, which may be the initial sequence shown in FIG. 6. In that regard, and as shown by reference number 715, the memory device 120 may perform the RR0 operation first, followed by the RR2 operation, the RR1 operation, and so forth until a read recovery operation results in a successful recovery from the first read failure.

As shown by reference number 720, the memory device 120 may identify a read recovery operation, of the set of read recovery operations, that results in successful recovery from the first read failure, in a similar manner as described in connection with reference number 520. In the depicted example, this may be the read recovery operation identified as RR13 (which, as described in connection with FIG. 6, may be a high energy operation associated with a read reference voltage shift of +900 millivolts and a CR operation).

Moreover, as shown by reference number 725, the memory device 120 may determine whether the successful read recovery operation (e.g., RR13 in this example) is eligible for prioritization. For example, in some implementations, a low energy operation may be eligible for prioritization, but a high energy operation may not be eligible for prioritization. Accordingly, the memory device 120 may determine whether the successful read recovery operation (RR13 in the depicted example) is a low energy operation or a high energy operation, and thus determine that the read recovery operation is eligible for prioritization when the successful read recovery operation is a low energy operation. In some other implementations, a first subset of operations (e.g., low energy operations) may always be eligible for prioritization, but a second subset of operations (e.g., high energy operations) may only be eligible for prioritization after a certain condition, such as when the memory device 120 has aged a certain amount (e.g., only after a certain quantity of P/E cycles, such as 5,000 cycles). In such examples, the memory device 120 may further determine that the read recovery operation is eligible for prioritization based on a quantity of P/E cycles associated with at least one of the memory section or the memory device 120.

For example, in the example shown, the successful read recovery operation (e.g., RR13) may be associated with the second subset of read recovery operations that are only eligible for prioritization after the quantity of P/E cycles (e.g., 5,000 cycles). Thus, if the number of the P/E cycles associated with the memory section or the memory device 120 is below the threshold quantity (e.g., 5,000 cycles), then the memory device 120 may determine that the successful read recovery operation is not eligible for prioritization, as shown by reference number 730. However, if the number of the P/E cycles associated with the memory section or the memory device 120 is above the threshold quantity (e.g., 5,000 cycles), then the memory device 120 may determine that the successful read recovery operation is eligible for prioritization, as shown by reference number 735. Moreover, and in a similar manner as described above in connection with reference number 525, in some implementations the memory device 120 may increment a success counter based on identifying the successful read recovery operation and/or based on determining that the successful read recovery operation is eligible for prioritization. That is, the memory device 120 may increment the success counter each time the successful read recovery operation results in successful recovery from a read failure.

As shown by reference number 740, the memory device 120 may generate a second sequence of read recovery operations. In aspects in which the successful read recovery operation is not eligible for prioritization (e.g., when the successful read recovery operation is a high energy operation and/or when the threshold quantity of P/E cycles has not been performed, as described in connection with reference number 730), the successful read recovery operation may not be prioritized in the second sequence of read recovery operations, as shown by reference number 745. However, in aspects in which the successful read recovery operation is eligible for prioritization (e.g., when the successful read recovery operation is a low energy operation and/or when the threshold quantity of P/E cycles has been performed, as described in connection with reference number 735), the successful read recovery operation may be prioritized in the second sequence of read recovery operations, as shown by reference number 750. Put another way, the memory device may generate a second sequence of read recovery operations in such a way that the successful read recovery operation (e.g., RR13) occurs earlier in the second sequence as compared to the first sequence based on the read recovery operation being eligible for prioritization. Moreover, in some implementations, generating the second sequence may be based on a value of the success counter or based on a flag that is set based on the value of the success counter, in a similar manner as described in connection with reference numbers 525 and 545.

The memory device 120 may thereafter detect a second read failure associated with the page type or the memory section (e.g., the first memory section 705-1), and/or may perform one or more read recovery operations, to recover from the second read failure, according to the second sequence. This may be performed in a similar manner as described above in connection with FIG. 5. Additionally, or alternatively, each time a certain read recovery operation results in a successful recovery from a read failure, the corresponding success counter may be incremented and/or a flag may be enabled, as described in connection with reference numbers 525 and 545, which may ultimately result in a read recovery operation associated with the flag being moved to an initial position (e.g., an ordinal first position, or a sticky read position), as described.

As indicated above, FIG. 7 is provided as an example. Other examples may differ from what is described with regard to FIG. 7.

FIG. 8 is a diagram illustrating an example 800 of prioritizing read recovery operations associated with a read recovery process.

The table shown in FIG. 8 summarizes multiple iterations of a read recovery process, such as one of the read recovery processes descried in connection with FIG. 5 or FIG. 7. Each iteration of the read recovery process may result in a certain state, labeled as states 1-12 in the table shown in FIG. 8. For each, state, a sequence of read recovery operations that will be used during a read recovery process in an effort to successfully recover from read failure are listed. For example, for the initial state (e.g., state 0), read recovery operations associated with a sequence of 0 mV, −300 mV, −600 mV, +300 mV, +600 mV, and so forth may be used to attempt to successfully recover from read failure. This sequence of read recovery operations is sometimes referred to as a static retry sequence. At this point, and as shown in the second column, a flag status may be disabled because none of the read recovery operations will have yet been successful the threshold number of times. Similarly, a disable flag counter and a success counter, which are described in more detail below, are initially set to zero. The table includes a column labeled "Read Last RR exists," which may indicate an ordinal position in the sequence of read recovery operations corresponding to the last successful read recovery operation. In the initial state (e.g., state 0), before the read recovery process has been performed, the "Read Last RR exists" column may be set to zero.

In the example shown, and as indicated in the "Successful Read Recovery Operation" column, when a read recovery process is performed using the sequence of read recovery operations associated with state 0, a read recovery operation associated with −600 mV may be the first read recovery operation that resulted in a successful recovery from the read failure. Thus, in the second iteration of the read recovery process (e.g., the iteration labeled as state 1), the read recovery operation associated with −600 mV may be prioritized in the sequence of read recovery operations. More particularly, as shown in the second row of the table, the read recovery operation associated with −600 mV has been moved to the second ordinal position in the sequence of read recovery operations, and the success counter has been incremented by one. Moreover, "Read Last RR exists" column now includes "1," which indicates that the last successful read recovery operation (e.g., the read recovery operation associated with −600 mV) is located in the second ordinal position in the sequence of read recovery operations.

In the example shown, and again as indicated in the "Successful Read Recovery Operation" column, when a read recovery process is performed using the sequence of read recovery operations associated with state 1, the read recovery operation associated with −600 mV may again be the first read recovery operation in the sequence of read recovery operations that resulted in a successful recovery from the read failure. Accordingly, in the third iteration of the read recovery process (e.g., state 2), the read recovery operation associated with −600 mV may be maintained as the second ordinal read recovery operation (e.g., may be maintained in the last successful read recovery position), the success counter may be incremented to two, and the "read Last RR exists" column may still include "1," indicating that the last successful read recovery operation is located in the ordinal second position in the sequence of read recovery operations.

Following the second iteration (state 1), however, the read recovery operation associated with −600 mV may not be successful. For example, as shown in the third iteration (state 2), the first successful read recovery operation in the sequence of read recovery operations is a read recovery operation associated with −900 mV, and, as shown in the fourth iteration (state 3), the first successful read recovery operation in the sequence of read recovery operations is a read recovery operation associated with ARC and/or LDPC soft decoding. Moreover, in some aspects, these read recovery operations may be associated with a high energy read recovery operation and/or may otherwise be ineligible for prioritization. Accordingly, as shown in the sequences of read recovery operations associated with states 3 and 4, the read recovery operation associated with −600 mV may remain in the second ordinal position, because this may be the last successful read recovery operation that is eligible for prioritization (and, accordingly, the success counter may remain at two, indicating that the read recovery operation associated with −600 mV has been successful twice before). Similarly, the "Read Last RR exists" column still indicates that the last successful read recovery operation that is eligible for prioritization is in the ordinal second position of the sequence of read recovery operations.

In state 4, however, a read recovery operation associated with −300 mV may be the first read recovery operation of the sequence that results in successful recovery from the read failure, and that read recovery operation may be a read recovery operation that is eligible for prioritization (e.g., may be a low energy operation). Accordingly, as shown in the row associated with state 5, the read recovery operation associated with −300 mV may be prioritized to the second ordinal position (e.g., the last successful read recovery operation position), and the success counter may be reset to one (because the read recovery operation now in the last successful read recovery operation position, which is the read recovery operation associated with −300 mV, has been successful one previous time). The "Read Last RR exists" column may still indicate that the last successful read recovery operation is in the ordinal second position.

The read recovery process may continue in this manner until the success counter reaches a success threshold, and thus the successful read recovery operation may be moved to the initial position (e.g., the sticky read position) of the sequence of read recovery operations. For example, in states 6, 7, 8, and 9 the read recovery operation associated with +600 mV is the first successful read recovery operation. Because the read recovery operation associated with +600 mV may be eligible for prioritization in the example, the read recovery operation associated with +600 mV may initially be moved to the last successful read recovery operation position (e.g., the ordinal second position) after state 6, and the success counter may be set to one. Thereafter, as the read recovery operation is successful three more times, the success counter may be incremented to two, three, and four. In this example, the success threshold may be equal to four, and thus the read recovery operation associated with +600 mV may be eligible for prioritization to the initial position in the sequence of read recovery operations, as shown at state 10 (e.g., the read recovery operation associated with +600 mV may be moved to the sticky read position). Moreover, the flag status may be set to "enabled" because the success threshold has been satisfied, and the column indicating an ordinal position of the last successful read recovery is thus updated to "0" (indicating that the last successful read recovery operation is now in the initial position of the sequence of read recovery operations). Put another way, in some implementations, the memory device 120 may set a flag to an enabled state based on determining that the quantity of times that the read recovery operation has resulted in successful read failure recovery for the page type and the memory section satisfies the success threshold, and the memory device may maintain the read recovery operation in the initial position while the flag is set to the enabled state.

In this way, in subsequent iterations of the read recovery process, the memory device 120 may initially attempt to recover data by first using the read recovery operation associated with +600 mV, because that read recovery operation will remain in the initial position (e.g., sticky read position) of the sequence of read recovery operations. In some implementations, a read recovery operation may remain in an initial position (e.g., the sticky read position)

until a flag status becomes disabled, which is described in more detail in connection with FIG. 9.

As indicated above, FIG. 8 is provided as an example. Other examples may differ from what is described with regard to FIG. 8.

FIG. 9 is a diagram illustrating another example 900 of prioritizing read recovery operations associated with a read recovery process.

In the table shown in FIG. 9, the flag status is shown as initially enabled, with a read recovery operation associated with −600 mV in the initial (e.g., sticky read) position. This may be because the read recovery operation associated with −600 mV is eligible for prioritization and/or resulted in a successful recovery from read failure a success threshold number of times, as described in connection with FIG. 8. In this example, a disable flag counter may be incremented each time the read recovery operation in the initial position does not result in a successful recovery, and the read recovery operation in the initial position may be removed from the initial position if the disable flag counter reaches a threshold number (e.g., a failure threshold).

More particularly, in this example, the read recovery operation associated with −600 mV is the first successful read recovery operation in state 0, and thus the read recovery operation associated with −600 mV may remain in the initial position in the sequence of read recovery operations for state 1, and the disable flag counter may not be incremented (e.g., may remain at zero). The column indicating the ordinal position of the last successful read recovery operation (e.g., the "Read Last RR exists" column) may similarly remain at zero in state 1. However, in state 1, the read recovery operation associated with +300 mV is the first successful read recovery operation, and thus the read recovery operation associated with +300 mV may be prioritized to the last successful read recovery operation position (e.g., the second ordinal position, as shown in state 2), the disable flag counter may be incremented by one because the read recovery operation associated with −600 mV did not result in a successful recovery, and the column indicating the ordinal position of the last successful read recovery operation may similarly be changed to 1.

In state 2, the read recovery operation associated with −600 mV (e.g., the initial read recovery operation performed in the sequence of read recovery operations associated with state 2) may once again result in successful recovery, and thus no changes may be implemented (e.g., the read recovery operation associated with −600 mV may remain in the initial, or sticky read, position, the read recovery operation associated with +300 mV may remain in ordinal second position, and the disable flag counter may remain at one). In state 3, the read recovery operation associated with an ARC or LDPC soft decoding operation is the first successful read recovery operation, but, as discussed, this read recovery operation may be ineligible for prioritization and thus may not be moved to the second ordinal position in the sequence of read recovery operations and/or no updates may be performed to the disable flag counter or the read last read recovery exists column.

Thereafter, in state 4, the read recovery operation associated with +600 mV is the first successful read recovery operation, and thus the read recovery operation associated with +600 mV may be prioritized to the last successful read recovery operation position (e.g., the second ordinal position, as shown in state 5), and the disable flag counter may be incremented by one (to a total of two) because the read recovery operation associated with −600 mV once again did not result in a successful recovery. Similarly, in state 5, the read recovery operation associated with +600 mV is the first successful read recovery operation, and the disable flag counter may be incremented by one (to a total of three, as shown in state 6) because the read recovery operation associated with −600 mV once again did not result in a successful recovery. Similarly, in state 6, the read recovery operation associated with +300 mV is the first successful read recovery operation, and the disable flag counter may be incremented by one (to a total of four) because the read recovery operation associated with −600 mV once again did not result in a successful recovery. Assuming for purposes of the example that a failure threshold is equal to four, the flag status may thereafter be disabled (as indicated in state 7), and/or an initial read recovery operation in the sequence of read recovery operations may be reset to a default read recovery operation (e.g., a read recovery operation associated with 0 mV in the depicted example). The read recovery process may thereafter repeat in a similar manner as described in connection with FIGS. 8 and 9. In this way, the memory device 120 may continually reorder read recovery operations in a sequence of read recovery operations in order to prioritize previously successful read recovery operations and deprioritize read recovery operations when they are no longer effective at successfully recovering from read page failure or the like.

As indicated above, FIG. 9 is provided as an example. Other examples may differ from what is described with regard to FIG. 9.

FIG. 10 is a flowchart of an example method 1000 associated with prioritization of successful read recovery operations. In some implementations, a memory device (e.g., memory device 120) may perform or may be configured to perform one or more process blocks of FIG. 10. Additionally, or alternatively, one or more components of the memory device 120 (e.g., controller 130 and/or read recovery component 260) may perform or may be configured to perform one or more process blocks of FIG. 10.

As shown in FIG. 10, the method 1000 may include detecting a first read failure associated with a page type and a memory section of the memory device (block 1010). As further shown in FIG. 10, the method 1000 may include performing multiple read recovery operations to recover from the first read failure, wherein the multiple read recovery operations are performed in a first order defined by a first sequence of read recovery operations (block 1020). As further shown in FIG. 10, the method 1000 may include identifying a read recovery operation, of the multiple read recovery operations that are performed, that results in successful recovery from the first read failure (block 1030). As further shown in FIG. 10, the method 1000 may include reordering the first sequence of read recovery operations to generate a second sequence of read recovery operations that prioritizes the read recovery operation as compared to the first sequence of read recovery operations (block 1040). As further shown in FIG. 10, the method 1000 may include detecting a second read failure associated with the page type and the memory section (block 1050). As further shown in FIG. 10, the method 1000 may include performing one or more read recovery operations to recover from the second read failure, wherein the one or more read recovery operations are performed in a second order defined by the second sequence of read recovery operations (block 1060).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein, such as the operations described in connection with FIGS. 5-9.

FIG. 11 is a flowchart of another example method 1100 associated with prioritization of successful read recovery operations. In some implementations, a memory device (e.g., memory device 120) may perform or may be configured to perform one or more process blocks of FIG. 11. Additionally, or alternatively, one or more components of the memory device (e.g., controller 130 and/or read recovery component 260) may perform or may be configured to perform one or more process blocks of FIG. 11.

As shown in FIG. 11, the method 1100 may include detecting a first read failure associated with a page type or a memory section of the memory device (block 1110). As further shown in FIG. 11, the method 1100 may include performing a set of read recovery operations to recover from the first read failure, wherein the set of read recovery operations are performed according to a first sequence of read recovery operations stored by the memory device (block 1120). As further shown in FIG. 11, the method 1100 may include identifying a read recovery operation, of the set of read recovery operations, that results in successful recovery from the first read failure (block 1130). As further shown in FIG. 11, the method 1100 may include incrementing a success counter, stored by the memory device, based on the read recovery operation resulting in successful recovery from the first read failure (block 1140). As further shown in FIG. 11, the method 1100 may include generating a second sequence of read recovery operations that prioritizes the read recovery operation as compared to the first sequence, wherein a position of the read recovery operation within the second sequence is based on a value of the success counter or is based on a flag that is set based on the value of the success counter (block 1150). As further shown in FIG. 11, the method 1100 may include detecting a second read failure associated with the page type or the memory section (block 1160). As further shown in FIG. 11, the method 1100 may include performing one or more read recovery operations, to recover from the second read failure, according to the second sequence (block 1170).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 5-9.

FIG. 12 is a flowchart of an example method 1200 associated with prioritization of successful read recovery operations. In some implementations, an apparatus (e.g., a memory device 120, a controller 130, and/or a read recovery component 260, among other examples) may perform or may be configured to perform one or more process blocks of FIG. 12.

As shown in FIG. 12, the method 1200 may include detecting a first read failure associated with a page type or a memory section (block 1210). As further shown in FIG. 12, the method 1200 may include performing a set of read recovery operations to recover from the first read failure, wherein the set of read recovery operations are performed based on a first sequence of read recovery operations (block 1220). As further shown in FIG. 12, the method 1200 may include identifying a read recovery operation, of the set of read recovery operations, that results in successful recovery from the first read failure (block 1230). As further shown in FIG. 12, the method 1200 may include determining that the read recovery operation is eligible for prioritization (block 1240). As further shown in FIG. 12, the method 1200 may include generating a second sequence of read recovery operations, wherein the read recovery operation occurs earlier in the second sequence as compared to the first sequence based on the read recovery operation being eligible for prioritization (block 1250). As further shown in FIG. 12, the method 1200 may include detecting a second read failure associated with the page type or the memory section (block 1260). As further shown in FIG. 12, the method 1200 may include performing one or more read recovery operations, to recover from the second read failure, according to the second sequence (block 1270).

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform or may be configured to perform one or more other methods based on operations described herein, such as the operations described in connection with FIGS. 5-9.

In some implementations, a method includes detecting, by a memory device, a first read failure associated with a page type and a memory section of the memory device; performing, by the memory device, multiple read recovery operations to recover from the first read failure, wherein the multiple read recovery operations are performed in a first order defined by a first sequence of read recovery operations; identifying, by the memory device, a read recovery operation, of the multiple read recovery operations that are performed, that results in successful recovery from the first read failure; reordering, by the memory device, the first sequence of read recovery operations to generate a second sequence of read recovery operations that prioritizes the read recovery operation as compared to the first sequence of read recovery operations; detecting, by the memory device, a second read failure associated with the page type and the memory section; and performing, by the memory device, one or more read recovery operations to recover from the second read failure, wherein the one or more read recovery operations are performed in a second order defined by the second sequence of read recovery operations.

In some implementations, a memory device includes one or more components configured to: detect a first read failure associated with a page type or a memory section of the memory device; perform a set of read recovery operations to recover from the first read failure, wherein the set of read recovery operations are performed according to a first sequence of read recovery operations stored by the memory device; identify a read recovery operation, of the set of read recovery operations, that results in successful recovery from the first read failure; increment a success counter, stored by the memory device, based on the read recovery operation resulting in successful recovery from the first read failure;

generate a second sequence of read recovery operations that prioritizes the read recovery operation as compared to the first sequence, wherein a position of the read recovery operation within the second sequence is based on a value of the success counter or is based on a flag that is set based on the value of the success counter; detect a second read failure associated with the page type or the memory section; and perform one or more read recovery operations, to recover from the second read failure, according to the second sequence.

In some implementations, an apparatus includes means for detecting a first read failure associated with a page type or a memory section; means for performing a set of read recovery operations to recover from the first read failure, wherein the set of read recovery operations are performed based on a first sequence of read recovery operations; means for identifying a read recovery operation, of the set of read recovery operations, that results in successful recovery from the first read failure; means for determining that the read recovery operation is eligible for prioritization; means for generating a second sequence of read recovery operations, wherein the read recovery operation occurs earlier in the second sequence as compared to the first sequence based on the read recovery operation being eligible for prioritization; means for detecting a second read failure associated with the page type or the memory section; and means for performing one or more read recovery operations, to recover from the second read failure, according to the second sequence.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   detecting, by a memory device, a first read failure associated with a page type and a memory section of the memory device;
   performing, by the memory device, multiple read recovery operations to recover from the first read failure,
      wherein the multiple read recovery operations are performed in a first order defined by a first sequence of read recovery operations;
   identifying, by the memory device, a read recovery operation, of the multiple read recovery operations that are performed, that results in successful recovery from the first read failure;
   reordering, by the memory device, the first sequence of read recovery operations to generate a second sequence of read recovery operations that prioritizes the read recovery operation as compared to the first sequence of read recovery operations,
      wherein reordering the first sequence comprises moving the read recovery operation to an initial position or to a position other than the initial position in the second sequence based on whether a quantity of times that the read recovery operation has resulted in successful read failure recovery for the page type and the memory section satisfies a success threshold;
   detecting, by the memory device, a second read failure associated with the page type and the memory section; and
   performing, by the memory device, one or more read recovery operations to recover from the second read failure,
      wherein the one or more read recovery operations are performed in a second order defined by the second sequence of read recovery operations.

2. The method of claim 1, wherein reordering the first sequence comprises moving the read recovery operation to the position in the second sequence other than the initial position based on determining that the quantity of times that the read recovery operation has resulted in successful read failure recovery for the page type and the memory section does not satisfy the success threshold.

3. The method of claim 2, wherein the position immediately follows the initial position.

4. The method of claim 1, wherein reordering the first sequence comprises moving the read recovery operation to the initial position in the second sequence based on determining that the quantity of times that the read recovery operation has resulted in successful read failure recovery for the page type and the memory section satisfies the success threshold.

5. The method of claim 4, further comprising setting a flag to an enabled state based on determining that the quantity of times that the read recovery operation has resulted in successful read failure recovery for the page type and the memory section satisfies the success threshold; and maintaining the read recovery operation in the initial position while the flag is set to the enabled state.

6. The method of claim 5, further comprising determining that a quantity of times that the read recovery operation has failed to result in successful read failure recovery for the page type and the memory section satisfies a failure threshold; and reordering a current sequence of read recovery operations to deprioritize the read recovery operation based on determining that the quantity of times that the read recovery operation has failed to result in successful read failure recovery for the page type and the memory section satisfies the failure threshold.

7. The method of claim 6, further comprising setting the flag to a disabled state based on determining that the quantity of times that the read recovery operation has failed to result in successful read failure recovery for the page type and the memory section satisfies the failure threshold; and maintaining a default initial read recovery operation in the initial position while the flag is set to the disabled state.

8. The method of claim 1, further comprising determining that the read recovery operation is eligible for prioritization; and wherein the first sequence is reordered based on determining that the read recovery operation is eligible for prioritization.

9. The method of claim 1, wherein the first sequence of read recovery operations and the second sequence of read recovery operations include at least one of:
a plurality of read recovery operations corresponding to a plurality of read voltages,
a corrective read operation,
an auto-calibration recovery operation that identifies a read voltage,
a soft low density parity check recovery operation, or
a redundant array recovery operation.

10. A memory device, comprising:
one or more components configured to:
detect a first read failure associated with a page type or a memory section of the memory device;
perform a set of read recovery operations to recover from the first read failure,
wherein the set of read recovery operations are performed according to a first sequence of read recovery operations stored by the memory device;
identify a read recovery operation, of the set of read recovery operations, that results in successful recovery from the first read failure;
increment a success counter, stored by the memory device, based on the read recovery operation resulting in successful recovery from the first read failure;
generate a second sequence of read recovery operations that prioritizes the read recovery operation as compared to the first sequence,
wherein a position of the read recovery operation within the second sequence is set to an ordinal first position or to an ordinal second position in the second sequence based on whether a value of the success counter satisfies a threshold or whether a flag that is set based on the value of the success counter is set to an enabled state or a disabled state;
detect a second read failure associated with the page type or the memory section; and
perform one or more read recovery operations, to recover from the second read failure, according to the second sequence.

11. The memory device of claim 10, wherein the one or more components, to generate the second sequence, are configured to set the position of the read recovery operation to the ordinal second position in the second sequence based on at least one of:
the value of the success counter failing to satisfy the threshold, or
the flag being set to the disabled state.

12. The memory device of claim 10, wherein the one or more components, to generate the second sequence, are configured to set the position of the read recovery operation to the ordinal first position in the second sequence based on at least one of:
the value of the success counter satisfying the threshold, or
the flag being set to the enabled state.

13. The memory device of claim 12, wherein the one or more components are configured to maintain the read recovery operation in the ordinal first position in an active sequence of read recovery operations until the read recovery operation fails to result in successful read failure recovery for the page type or the memory section a threshold quantity of times.

14. The memory device of claim 10, wherein the one or more components are configured to store an indication of whether the read recovery operation is eligible for prioritization; and
wherein the one or more components, to generate the second sequence, are configured to generate the second sequence based on the indication.

15. The memory device of claim 10, wherein the one or more components are configured to set the flag to the enabled state based on the value of the success counter satisfying the threshold.

16. The memory device of claim 15, wherein the one or more components are configured to reset the success counter based on setting the flag to the enabled state.

17. The memory device of claim 10, wherein the read recovery operation is a first read recovery operation and the position is a primary position;
wherein the one or more components are configured to set the flag to the enabled state and reset the success counter based on the value of the success counter indicating that the first read recovery operation has succeeded a threshold quantity of times;
wherein the one or more components, to generate the second sequence, are configured to set the first read recovery operation to the ordinal first position in the second sequence based on the flag being set to the enabled state; and
wherein the one or more components are further configured to:
identify a second read recovery operation, of the set of read recovery operations, that results in successful recovery from a third read failure associated with the page type or the memory section;
increment the success counter based on the second read recovery operation resulting in successful recovery from the third read failure; and
generate a third sequence of read recovery operations that prioritizes the first read recovery operation and the second read recovery operation as compared to the first sequence.

18. A memory device, comprising:
one or more components configured to:
detect a first read failure associated with a page type or a memory section of the memory device;

perform a set of read recovery operations to recover from the first read failure,
wherein the set of read recovery operations are performed according to a first sequence of read recovery operations stored by the memory device;
identify a read recovery operation, of the set of read recovery operations, that results in successful recovery from the first read failure;
increment a success counter, stored by the memory device, based on the read recovery operation resulting in successful recovery from the first read failure;
store multiple indications of whether the read recovery operation is eligible for prioritization,
wherein each indication, of the multiple indications, corresponds to a different age of the memory device;
generate a second sequence of read recovery operations that prioritizes the read recovery operation as compared to the first sequence,
wherein generating the second sequence is based on an age of the memory device and an indication, of the multiple indications, that corresponds to the age of the memory device, and
wherein a position of the read recovery operation within the second sequence is based on a value of the success counter or is based on a flag that is set based on the value of the success counter;
detect a second read failure associated with the page type or the memory section; and
perform one or more read recovery operations, to recover from the second read failure, according to the second sequence.

19. A memory device, comprising:
one or more components configured to:
detect a first read failure associated with a page type or a memory section of the memory device;
perform a set of read recovery operations to recover from the first read failure,
wherein the set of read recovery operations are performed according to a first sequence of read recovery operations stored by the memory device;
identify a read recovery operation, of the set of read recovery operations, that results in successful recovery from the first read failure;
increment a success counter, stored by the memory device, based on the read recovery operation resulting in successful recovery from the first read failure;
generate a second sequence of read recovery operations that prioritizes the read recovery operation as compared to the first sequence,
wherein a position of the read recovery operation within the second sequence is based on a value of the success counter or is based on a flag that is set based on the value of the success counter;
maintain a default initial read recovery operation in an ordinal first position of an active sequence of read recovery operations until the value of the success counter satisfies a threshold or until the flag is set to an enabled state;
detect a second read failure associated with the page type or the memory section; and
perform one or more read recovery operations, to recover from the second read failure, according to the second sequence.

20. An apparatus, comprising:
means for detecting a first read failure associated with a page type or a memory section;
means for performing a set of read recovery operations to recover from the first read failure,
wherein the set of read recovery operations are performed based on a first sequence of read recovery operations;
means for identifying a read recovery operation, of the set of read recovery operations, that results in successful recovery from the first read failure;
means for determining that the read recovery operation is eligible for prioritization based on a quantity of program-erase cycles associated with at least one of the memory section or apparatus;
means for generating a second sequence of read recovery operations, wherein the read recovery operation occurs earlier in the second sequence as compared to the first sequence based on the read recovery operation being eligible for prioritization;
means for detecting a second read failure associated with the page type or the memory section; and
means for performing one or more read recovery operations, to recover from the second read failure, according to the second sequence.

21. The apparatus of claim 20, further comprising:
means for incrementing a success counter based on identifying the read recovery operation and determining that the read recovery operation is eligible for prioritization,
wherein the success counter is incremented each time the read recovery operation results in successful recovery from a read failure; and
wherein the means for generating the second sequence comprises means for generating the second sequence based on a value of the success counter or based on a flag that is set based on the value of the success counter.

22. The apparatus of claim 21, wherein the means for generating the second sequence comprises means for setting the read recovery operation in a specific position in the second sequence based on the value of the success counter or based on the flag.

23. The apparatus of claim 22, wherein the means for generating the second sequence comprises means for setting the read recovery operation in a specific position in the second sequence based on whether the value of the success counter satisfies a threshold or based on whether the flag is set to an enabled state or a disabled state.

24. The apparatus of claim 20, wherein the page type corresponds to a particular bit of a particular type of memory cell that stores a particular quantity of bits.

25. The apparatus of claim 20, wherein the page type is a page of a single level cell, a lower page of a multi-level cell, an upper page of the multi-level cell, a lower page of a triple-level cell, an upper page of the triple-level cell, an extra page of the triple-level cell, a lower page of a quad-level cell, an upper page of the quad-level cell, an extra page of the quad-level cell, or a top page of the quad-level cell.

* * * * *